Nov. 27, 1956
R. L. SMIRL
2,771,976
SPEED RESPONSIVE FLUID CLUTCH
Original Filed March 5, 1949
2 Sheets—Sheet 1
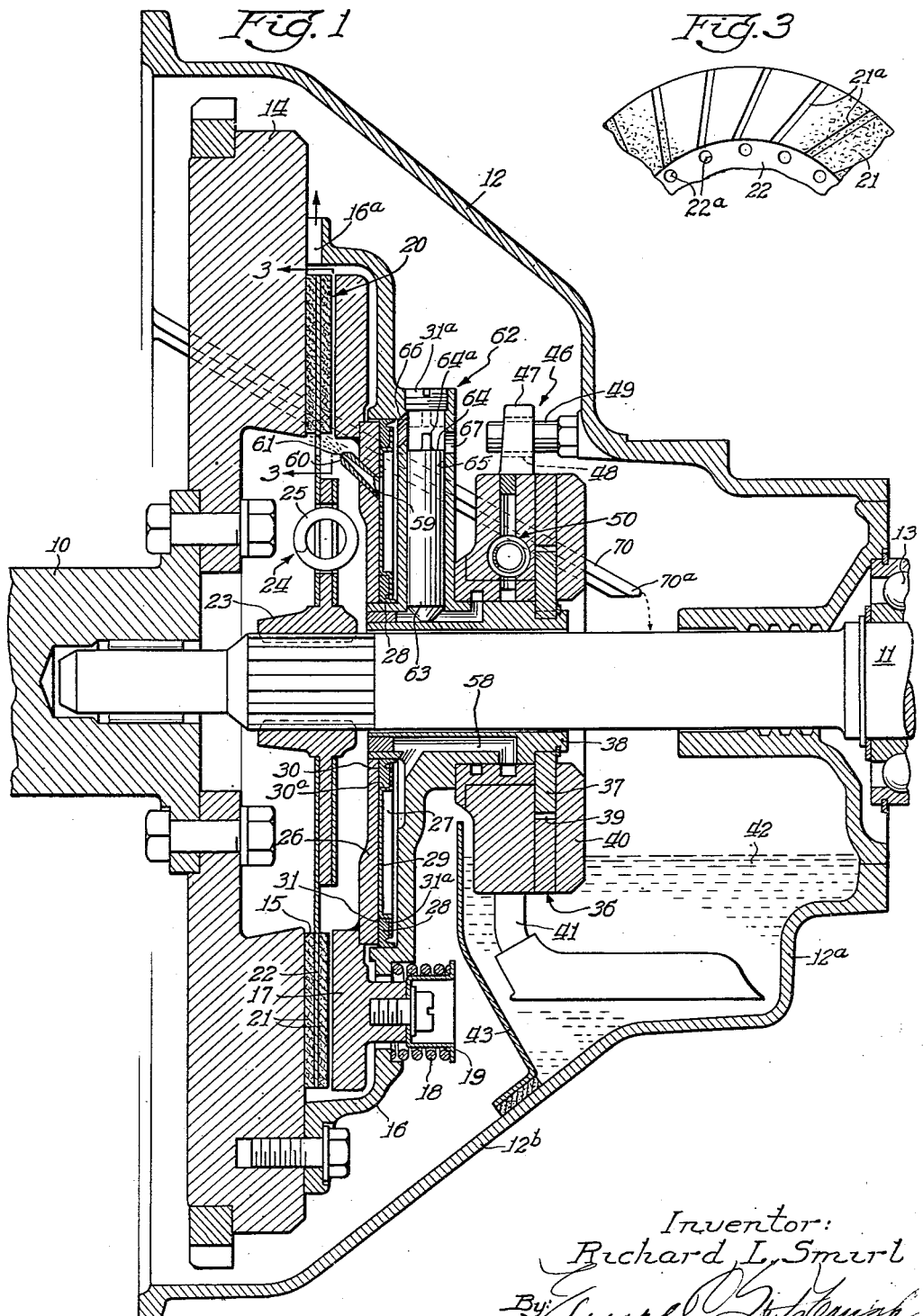
Inventor:
Richard L. Smirl

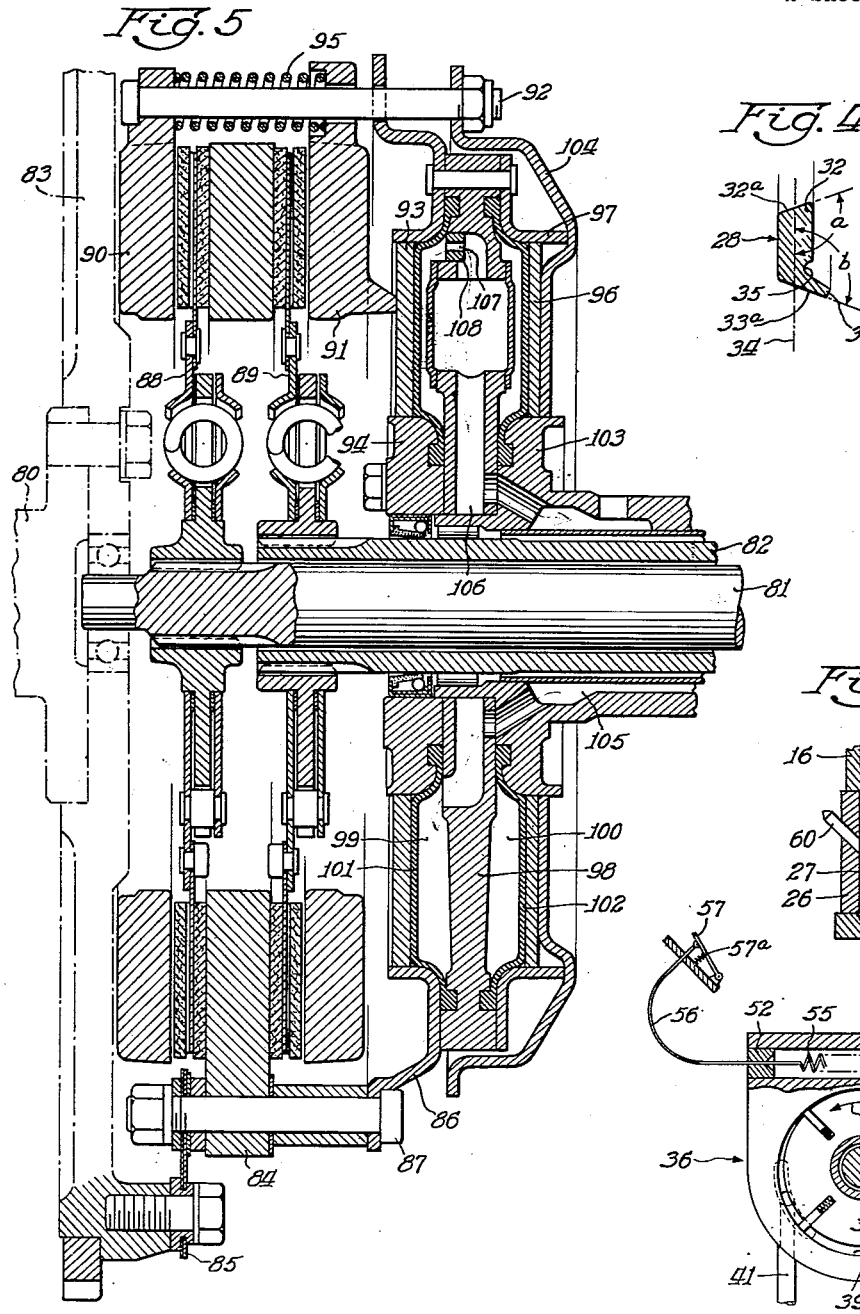

United States Patent Office 2,771,976
Patented Nov. 27, 1956

2,771,976
SPEED RESPONSIVE FLUID CLUTCH

Richard L. Smirl, La Grange Park, Ill., assignor to Borg-Warner Corporation, Chicago, Ill., a corporation of Illinois Continuation of abandoned application Serial No. 79,883, March 5, 1949. This application March 10, 1955, Serial No. 493,440

1 Claim. (Cl. 192—85)

My invention relates to friction clutches especially adapted for use in motor vehicles and more particularly to controlling means for such clutches.

This application is a continuation of my copending application, Serial No. 79,883, filed March 5, 1949, for "Speed Responsive Fluid Clutch," now abandoned.

It is an object of the present invention to provide an improved hydraulic clutch control which engages the clutch according to the speed of the drive shaft of the clutch. More particularly it is an object to provide a fluid motor for engaging the clutch, a hydraulic pump for applying fluid pressure to engage the motor and an orifice in connection with the piston and pump which provides the fluid pressure acting on the piston that increases in accordance with drive shaft speed.

It is another object of the invention to provide improved means for cooling a friction clutch preferably including means directing a jet of cooling fluid on the friction faces of the clutch. More specifically, it is an object to utilize the orifice just mentioned for directing the fluid on the friction faces of the clutch and to provide grooves in the friction faces for conducting the cooling fluid.

It is another object of the invention to provide a new and advantageous mounting for the pump just mentioned which allows a limited translatory movement of the pump casing with respect to the housing for the clutch to provide for any slight misalignment of the shafts which constitute drive and driven shafts for the clutch.

It is another object of the invention to provide an improved arrangement for conducting the lubricating fluid for the clutch from one portion of the clutch housing, which is relatively deep compared to a second portion of the clutch housing, to the latter portion, and more specifically it is an object to provide a fluid conducting gutter inside the clutch housing for performing this function.

It is another object of the invention to provide a fluid pressure actuated piston acting directly on a pressure plate in the friction clutch, and it is also an object to provide an improved seal for the fluid actuated clutch piston.

The invention consists of the novel constructions, arrangements and devices to be hereinafter described and claimed for carrying out the above-stated objects and such other objects as will appear from the following description of a preferred embodiment of the invention illustrated with reference to the accompanying drawings, in which:

Fig. 1 is a longitudinal sectional view of a friction clutch embodying the principles of the invention;

Fig. 2 is a diagrammatic illustration of the controls used in conjunction with the clutch illustrated in Fig. 1;

Fig. 3 is a sectional view on a reduced scale taken on line 3—3 of Fig. 1;

Fig. 4 is a cross-sectional view of the seal used for a clutch applying piston in the clutch illustrated in Fig. 1, with the seal being shown on an enlarged scale and free of the piston and its surrounding cylinder; and Fig. 5 is a longitudinal sectional view of a clutch constituting a modification of the invention.

Like characters of reference designate like parts in the several views.

Referring to the drawings, the clutch illustrated in Fig. 1 comprises a drive shaft 10 and a driven shaft 11 piloted within the shaft 10. The drive shaft 10 is adapted to be connected with the engine (not shown) of the vehicle in which the clutch is installed, and the driven shaft 11 is adapted to be connected by any suitable gearing (not shown) with the road wheels (not shown) of the vehicle. Both of the shafts 10 and 11 are rotatably disposed with respect to a clutch housing 12, the shaft 11 being so disposed within the housing by means of a bearing 13, as shown.

A flywheel 14 is fixed to the shaft 10 and is provided with a friction surface 15 on one side thereof. A cover 16 is fixed to the flywheel and carries a pressure plate 17 which is connected to the cover by means of compression springs 18 (one being shown in the drawing) and spring retainers 19 bolted to the pressure plate 17.

A friction clutch disc 20 is splined on to the shaft 11, the clutch disc is of ordinary construction and comprises a pair of annular discs 21 of any suitable friction material, such as a composition of asbestos, fixed on to a metal disc 22. The clutch disc 20 includes a hub 23 splined on to the shaft 11, and a vibration dampener 24 is provided between the disc and the hub 23. The vibration dampener comprises springs 25 disposed in window-like openings provided in the hub 23 and disc 22 so that the springs 25 are effectively in a drive between the disc 22 and hub 23. Since the disc 20 is of well-known construction, it will not be further described in detail.

The pressure plate 17 is moved with respect to the flywheel 14 in order to engage the clutch disc 20 between the pressure plate and the face 15 on the flywheel by means of an annular piston 26 slidably disposed in an annular opening 27 in the clutch cover 16. The piston 26 acts directly on the pressure plate as shown. The piston 26 carries a pair of seals 28 held in place on inner and outer edges of the piston by means of a retaining member 29 fixed to the piston.

The retaining member 29 provides annular grooves 30 and 31 on the inner and outer edges of the piston 26 for the seals 28. Referring to Fig. 4, it will be observed that the seal has a root portion 32 and a lip portion 33. The inner surface 32a of the root portion 32 which is in contact with the bottoms 30a or 31a of the grooves 30 or 31, it will be observed, in the free condition of the seal as it is shown in Fig. 4 extends at an obtuse angle $a$ with respect to the center line 34 of the root portion 32. The outer face 33a of the lip portion which contacts a side of the annular opening 27 in the clutch cover 16 also extends at an obtuse angle $b$ with respect to the center line 34 of the root portion 32, as shown. The seal 28 is of a rubber-like resilient material, and when the seal is in place in the grooves 30 and 31, it is confined between the retainer 29 and the outer surfaces of the opening 27 in a compressed condition. The parts of the seal to the right of its center line 34 are compressed in particular so as to bring the surface 32a and the surface 33a to extend at substantially right angles with respect to the center line 34, and the lip 33 is bent in particular in the region of the groove 35 separating the lip portion and the root portion.

The hydraulic control system for the clutch includes a pump 36. The pump is of a rotary eccentric type comprising a rotor 37 fixed on a sleeve portion 38 of the cover 16. The rotor 37 is rotatable in a chamber 39 formed in a pump casing 40. The clutch pump rotor 37, as will be noted, is eccentrically located with respect to the chamber 39 and has a plurality of radially slidable vanes 37a. The pump has an inlet 41 which extends into a body of oil 42 located in a portion 12a of the clutch housing which is relatively shallow compared to the other, forward portion 12b of the clutch housing. The two housing portions are, incidentally, divided by a partition 43 which forms a portion of the container for the body of oil 42. The pump 36 has a fluid outlet 44 to which fluid will be delivered by the pump when the rotor 37 is rotated in the direction of the arrow 45 in accordance with the well-known principles of operation of such type pumps. The pump casing 40 has a lost motion connection 46 with the clutch housing 12 which is formed by a lug 47 having an opening 48 therethrough and which is disposed on a pin 49 fixed in the housing 12. The connection 46 allows a limited vertical movement of the pump housing 40 which might occur if parts of the pump and shafts 10 and 11 are not all absolutely concentrically located.

The pump 36 is connected to a valve 50 which comprises a valve chamber 51. One end of the chamber is closed by a plug 52, and the other end is formed with a valve seat 53 for a semi-spherical relief valve piston 54. The piston 54 is urged against its seat 53 by a tension spring 55 one end of which is attached to the valve 54 and the other end of which is attached to a control wire 56 communicating with a foot pedal 57 and adapted to be actuated thereby so as to variably relieve the tension of the spring 55.

The piston 26 is connected with the pump 36 and valve 50 by means of a passage 58. The piston 26 and its liner 29 are provided with openings 59 therein, and a nozzle 60 having an internal orifice 61 fits in the openings 59. The nozzle 60 directs fluid from behind the piston on to the inner peripheries of the friction discs 21, and, as shown, the metal disc 22 is provided with openings 22a therein through which the liquid may pass on to the inner periphery of the disc 21 opposite the nozzle 60.

The nozzle 60 has a two-fold purpose: It provides cooling liquid for the friction faces of the clutch, and it in conjunction with the pump 36 provides a variable fluid pressure acting on the piston 26.

For carrying out the first purpose of cooling the clutch disc 20, the friction discs 21 are provided with approximately radially extending grooves 21a in their friction faces through which the liquid may pass from the inner peripheries of the facings 21 on to which it is directed by the nozzle 60. The clutch cover 16 is provided with arches 16a which are spaced from the surface 15 of the flywheel 14, and the fluid flowing through the grooves 21a may escape through these arches, it being understood that centrifugal force causes the fluid to flow through the grooves 21a and under the arches 16a.

The nozzle 60 discharging fluid from the rear of the piston 26 also functions in conjunction with the pump 36 to regulate the fluid pressure applied to the piston 26. The orifice 61 in the nozzle 60 functions with the pump 36 to provide a fluid pressure behind the piston 26 that increases in accordance with the speed of the drive shaft 10 by which the pump 36 is driven, assuming that the output of the pump is otherwise into a closed system, as will hereinafter be described in greater detail. The orifice 61 in the nozzle 60, incidentally, is a "Venturi" type orifice, that is, it gradually decreases in area from its inlet end to its outlet end. It will be noted also that it is sharp edged on its outlet end.

A valve 62 is provided for opening the conduit 58 and the cavity 27 under certain conditions. Under ordinary conditions, however, the valve 62 is closed so that the nozzle 60 together with the pump 36 functions in conjunction with each other to provide the gradual increase in clutch engaging fluid pressure that has just been described. The valve 62 comprises a valve piston 63 having an outer end face 64 and slidably disposed in a cylinder 65 which is provided in the clutch cover 16. The cylinder 65 has a passage 66 connecting it with the cavity 27 and a passage 67 by means of which the fluid within the cylinder 65 may be released to the housing 12.

A passage 68 is provided in the sleeve 38 which is in communication with the inner end 69 of the valve piston 63 for augmenting the effect of centrifugal force on the piston 63 in urging the piston 63 outwardly for purposes and under conditions which will be hereinafter described.

A gutter 70 is provided inside the clutch housing 12 and slants from the forward end of the clutch housing 12 downwardly so that its end 70a is above the pool of oil 42 in the portion 12a of the clutch housing. Any oil that is collected by the gutter 70 will thus fall into this portion of the clutch housing.

In operation of the clutch, the pressure plate 17 is applied with a pressure that varies in accordance with the speed of the drive shaft assuming the valves 62 and 50 are closed. Under ordinary clutch engaging conditions the valve piston 54 is held in contact with its seat 53 through the instrumentality of the spring 55 so as to close the valve 50, and the valve piston 63 is in its outermost position with its stem 64a in contact with the cap 31a, being held in such position by the centrifugal force acting on the valve piston 63. The pressure of oil effective on the clutch operating piston 26 is under these conditions determined by the output of the pump 36 which flows through the orifice 61. It has been found that this pressure increases with the speed of the drive shaft 10 which drives the pump 36 so as to give a smooth engagement of the clutch. This increase in fluid pressure I ascribe to the fact that the resistance to the flow of liquid through the orifice in the nozzle 60 increases with the rate of flow through the nozzle. It will be noted, incidentally, in connection with the "Venturi" type orifice 61 that the fluid flow therethrough increases in velocity due to the decreasing cross-sectional area of the orifice.

The valve 50 functions to selectively cause engagement and disengagement of the clutch and to regulate the fluid pressure in the conduit 58 to keep it at a predetermined maximum pressure after the clutch has been engaged. When the treadle 57 is depressed, it acts through the cable 56 and spring 55 so as to release the spring force acting on the valve piston 54 tending to hold it on its seat 53, so that the fluid output of the pump 36 may move the piston 54 off its seat to allow the pump to discharge between the piston and seat. The clutch is thus disengaged. When the treadle 57 is again released, the spring 57a acting on the treadle functions to return the parts to their original positions. The cable 56 and spring 55 then function to yieldably hold the piston 54 on its seat 53, and the valve 50 will not open again until the pressure of the oil discharged by the pump exceeds the predetermined maximum. The clutch is then engaged, assuming the drive shaft speed is high enough.

At normal vehicle driving speeds, the orifice 61 and the valve 50 are adapted to develop more than sufficient pressure for complete engagement of the clutch. The pressure in the system is allowed to develop to a certain extent beyond that required for complete clutch engagement so as to insure against any slippage of the clutch when engaged. The valve 50 functions to limit the pressure in the conduit 58 which is applied to the clutch piston 26 by opening at the predetermined maximum fluid pressure and venting excess fluid from the system at that pressure. Thus the pressure applied to the piston 26 increases with drive shaft speed until a pressure slightly above that required for a full engagement of the clutch is reached after which the valve 50 functions as a relief valve to limit the fluid pressure applied to the piston 26 to the predetermined pressure.

The valve 62 is provided for the purpose of relieving excessive fluid pressure in the cavity 27 at low speeds of the shaft 10. Such excessive pressures occur when the oil 42 is cold, and it has excessive viscosity. Regardless of the position of the piston 63 in its cylinder 65, the fluid pressure in the cavity 27 is operative on the end face 64 of the piston tending to move the piston inwardly into its open position in which the passages 66 and 67 are connected through the cylinder 65 and in which position the valve 63 is illustrated. When the fluid pressure is excessive at low engine speeds within the cavity 27 due to excessive viscosity of the oil 42, the fluid pressure acting on the end face 64 holds the piston 63 in its illustrated position and allows the fluid to discharge through the passages 66 and 67. When the oil becomes warmed and its viscosity decreases, the fluid pressure acting on the end face 64 of the piston 63 decreases, and the valve moves outwardly under the action of the centrifugal force into its closed position. Under ordinary operating conditions in which the oil 42 does not have excessive viscosity, the centrifugal force acting on the piston 63 due to rotation of the drive shaft 10 and clutch cover 16 functions to hold it in its outer passage closing position.

The clutch disc 20 is cooled by the oil that flows through the nozzle 60 and which passes through the grooves 21a in the friction faces 21. After the oil has passed through the grooves 21a, it then passes through the arches 16a into the portion 12b of the clutch housing. The oil collects in the lower portion of the forward end of the housing, and the flywheel 14 is then effective to throw the oil on to the gutter 70, and the oil then flows down the gutter to its end 70a from which it drops into the portion 12a of the housing into the pool of oil 42 maintained by the partition 43.

It will be noted that the casing 40 of the pump 36 has a lost motion connection with the clutch housing 12 by means of its enlarged opening 48 in the lug 47 through which the pin 49 projects, and the pump casing 40 may thus have a limited translatory movement with respect to the housing 12 in order to allow for any minor eccentricities of the shafts 10 and 11 and the parts of the pump which may occur due to the normal tolerances allowed in manufacturing such parts.

It will be noted that the clutch operating piston 26 acts directly on the pressure plate 17 which is a simple and economically manufactured arrangement.

As has been described, the seal 28 in its free condition has the face 32a of its root portion 32 and also the face 33a of the lip 33 adapted to be in contact with the faces of the cooperating cavity 27 in which the piston 26 moves extending at oblique angles with respect to the center line 34 of the seal. Without such obtuse angles of the faces 32a and 33a in the free condition of the seal, there may be a tendency of the seal to turn over when pressure is applied to the piston 26, and this construction of the seal obviates such difficulties.

Referring to Fig. 5, the modified form of the invention disclosed therein comprises a drive shaft 80 and a pair of driven shafts 81 and 82. A flywheel 83 is fixed to the drive shaft 80, and a pressure plate 84 is connected with the flywheel by means of metal straps 85. A clutch cover 86 is fixed to the pressure plate 84 by means of bolts 87. The clutch comprises two friction discs 88 and 89, fixed respectively to the shafts 81 and 82, and a movable pressure plate 90 is provided in connection with the friction disc 88 and a movable pressure plate 91 is provided in connection with the friction disc 89. Both of the pressure plates 90 and 91 are disposed on bolts 92 carried by the clutch cover 86, as shown.

An annular piston 93 is movably disposed in a cylindrical opening in the clutch housing 86 and on a hub portion 94. The piston 93 acts directly on the movable pressure plate 91, as shown. Springs 95 are provided between the pressure plates 90 and 91 for yieldably holding them separated, and engaging movements both of the pressure plates are resisted by the springs 95.

A piston 96 is provided for actuating the pressure plate 90, and this piston is slidably disposed in a member 97 which is fixed to the clutch cover 86. A member 98 is provided between the pistons 93 and 96, and this member functions to provide a partition between fluid pressure chambers 99 and 100 for the pistons 93 and 96 respectively. Flexible diaphragms 101 and 102 are provided for respectively sealing the chambers 99 and 100, as shown.

The piston 96 is disposed within the member 97 and on a hub portion 103, as shown. The piston 96 is connected by means of a housing member 104 and the bolts 92 with the pressure plate 90 for applying the pressure plate to the friction disc 88.

A fluid passage 105 is provided which extends through the hub portion 103 and through the partition 98 into the chamber 99 for applying a fluid pressure to the diaphragm 101 and the piston 93. A fluid exhaust passage 106 is provided in the member 98 and in the portion 103, and the chamber 99 is in communication with the passage 106 by means of an orifice 107 which constitutes the internal bore of a cylindrical element 108 disposed between the chamber 99 and the passage 106. The chamber 99 is adapted to be connected to the outlet of a pump driven by the drive shaft 80 such as to a conduit 58 with the pump 36 being driven by the shaft 80, and in conjunction with the pump driven by the drive shaft, the orifice 107 provides a similar engagement of the clutch disc 89 between the pressure plates 84 and 91 which varies in intensity with the speed of the drive shaft similar to that clutch engagement provided by the nozzle 60 in the first embodiment of the invention.

Clutch engaging force is transmitted to the pressure piston 96 for engaging the clutch disc 88 between the pressure plates 84 and 90 through the bolts 92 and the housing member 104. A passage (not shown) which is similar to the passage 105 in connection with the pressure chamber 99 is provided for supplying a fluid pressure to the pressure chamber 100 in order to move the piston 96 and the associated pressure plate 90. No orifice is provided in connection with the chamber 100, and the engagement of the clutch disc 88 is thus not speed responsive.

The principal difference between the orifices in Fig. 1 and Fig. 5 embodiments lies in the fact that the orifice 107 is shorter, of uniform diameter and sharp edged on both its ends rather than gradually narrowing and coming to a sharp edge on its outlet end as in the first embodiment. The Fig. 5 type of orifice is considered the most advantageous giving the best clutch engaging results due to the fact that this orifice creates a greater turbulence in the fluid passing therethrough, and the effect of the changes in viscosity of the fluid with changes in temperature is smaller than with the non-turbulent type or orifice in the nozzle 60. The orifice in the nozzle 60 is more of a viscous type of orifice than is the orifice 107 in restraining the flow of fluid therethrough, principally due to the frictional effect of the fluid on the sides of the orifice while the orifice 107 is more of a turbulent type than the orifice in the nozzle 60 in restraining the flow of fluid therethrough principally due to the turbulence created in the fluid due to the sharp inlet and outlet ends of the orifice.

Incidentally, in connection with both the Fig. 1 and Fig. 5 embodiments of the invention, it is contemplated that there shall be no substantial restrictions to the flow of fluid between the pump and the respective clutch applying pistons, and the orifices by-pass fluid from the respective piston pressure chambers. This construction is in direct contrast with the usual arrangement for giving a graduated engagement to a friction engaging mechanism in which all leakage of fluid is carefully sealed up and restrictions are added to the flow of fluid between a pump and applying piston for slowing the action of the piston.

I wish it to be understood that my invention is not to be limited to the specific constructions or arrangements shown and described, except only insofar as the claims may be so limited, as it will be apparent to those skilled

I claim:

In power transmission mechanism, a drive shaft, a driven shaft and a friction engaging means for establishing drive therebetween, a fluid pressure operated mechanism for effecting engagement of said friction means, and an automatic fluid pressure control system for graduating engagement of said friction means comprising a drive shaft driven pump having its outlet hydraulically connected by means of a passage with said pressure operated mechanism for applying the pump outlet pressure to the said mechanism and an orifice through which the pump output can discharge, said passage being relatively large in cross section and said orifice being small in cross section with respect to the passage thereby to build up fluid pressure in said pressure operated mechanism and to increase the engaging pressure of said friction means as the speed of said drive shaft increases from a starting position, said orifice being of a fixed type and gradually decreasing in area from its inlet end to its outlet end and having sharp edges on its outlet end to minimize the effect of changes in viscosity of the fluid on the pressure built up by the flow of fluid through it.

References Cited in the file of this patent

UNITED STATES PATENTS

| | | |
|---|---|---|
| 794,899 | Sturtevant | July 18, 1905 |
| 1,934,850 | Fromaget | Nov. 4, 1933 |
| 2,163,202 | Kegresse | June 20, 1939 |
| 2,314,554 | Pennington | Mar. 23, 1943 |
| 2,498,123 | Hobbs | Feb. 21, 1950 |
| 2,505,450 | Wemp | Apr. 25, 1950 |
| 2,663,393 | Livermore | Dec. 22, 1953 |